United States Patent
Chen et al.

(10) Patent No.: US 8,963,884 B2
(45) Date of Patent: Feb. 24, 2015

(54) OPTICAL TOUCH PANEL AND METHOD OF DETECTING TOUCH POINT POSITIONS ON AN OPTICAL TOUCH PANEL

(75) Inventors: Jau-Yu Chen, New Taipei (TW); Chih-Hao Chen, New Taipei (TW)

(73) Assignee: Lite-On Semiconductor Corp., New Taipei (TW)

( * ) Notice: Subject to any disclaimer, the term of this patent is extended or adjusted under 35 U.S.C. 154(b) by 907 days.

(21) Appl. No.: 13/099,551

(22) Filed: May 3, 2011

(65) Prior Publication Data
US 2012/0162136 A1 Jun. 28, 2012

(30) Foreign Application Priority Data
Dec. 24, 2010 (CN) .......................... 2010 1 0613520

(51) Int. Cl.
*G06F 3/042* (2006.01)
*G06F 3/041* (2006.01)
(52) U.S. Cl.
CPC .............. *G06F 3/042* (2013.01); *G06F 3/0416* (2013.01)
USPC ......................................... 345/175; 345/173
(58) Field of Classification Search
CPC ................ G06F 3/42; G06F 3/41; G09G 5/00
USPC .................................................. 345/173–176
See application file for complete search history.

(56) References Cited

U.S. PATENT DOCUMENTS

| 8,421,775 | B2 * | 4/2013 | Kim et al. ...................... 345/175 |
| 8,493,365 | B2 * | 7/2013 | Jhu et al. ....................... 345/176 |
| 2006/0132454 | A1 * | 6/2006 | Chen et al. .................... 345/173 |
| 2012/0038589 | A1 * | 2/2012 | Lamanna et al. ............. 345/175 |

\* cited by examiner

*Primary Examiner* — Quan-Zhen Wang
*Assistant Examiner* — Yuk Chow
(74) *Attorney, Agent, or Firm* — Rosenberg, Klein & Lee

(57) ABSTRACT

An optical touch panel and a method of detecting touch point positions on an optical touch panel are provided. The optical touch panel includes a processing unit, and at least three optical detectors divided into at least two detector groups. Each of the optical detectors is configured to output a signal indicating intensities of light detected thereby, and is associated with a detection range. The processing unit is configured to receive the signals from the optical detectors, to determine which of the optical detectors detect touch points within the respective detection range according to the signals received by the processing unit, and to obtain an optimum set of coordinates for at least one of the touch points with respect to an optimum detector group which is one of the detector groups formed by the optical detectors that detect the touch points.

12 Claims, 6 Drawing Sheets

OPTICAL TOUCH PANEL AND METHOD OF DETECTING TOUCH POINT POSITIONS ON AN OPTICAL TOUCH PANEL

CROSS-REFERENCE TO RELATED APPLICATION

This application claims priority of Chinese Application No. 201010613520.1, filed on Dec. 24, 2010.

BACKGROUND OF THE INVENTION

1. Field of the Invention

The present invention relates to an optical touch panel and a method of detecting touch point positions on an optical touch panel, more particularly to an optical touch panel and a method of detecting multiple touch point positions on an optical touch panel.

2. Description of the Related Art

Referring to FIG. 1, a conventional optical touch panel 1 includes a support 11 defining a surface 111, light sources 12, a pair of optical detectors 13, and a processing unit 14. Each of the optical detectors 13 is configured to output a signal indicating intensities of light detected thereby. The processing unit 14 is operable, according to the signals from the optical detectors 13, to compute coordinates of at least one touch point 10 on the surface 111 of the support 11 using trigonometric functions. However, a value of the trigonometric functions with respect to an angle is approximate to 0 or infinity when the angle is approximate to 0 degree. Accordingly, when a position of the touch point 10 on the surface 111 is close to an upper-right corner or an upper-left corner, angles α and β of the touch point 10 with respect to the respective optical detectors 13 are approximate to 0 degree such that values of the trigonometric functions with respect to the angles α and β are approximate to 0 or infinity and coordinates of the touch point 10 thus computed are relatively inaccurate. Further, when there are a plurality of touch points on the surface 111, it is hard to determine that the coordinates thus computed correspond to a real touch point or to a ghost point.

U.S. Pat. No. 5,317,140 discloses a system and a method for optically determining the direction of an object within a generally planar viewing field. The system includes a pair of cameras positioned at upper corners, and an optional central camera to improve resolution near an upper middle region of the viewing field. However, this patent fails to provide a solution for determining a ghost point.

SUMMARY OF THE INVENTION

Therefore, an object of the present invention is to provide a method of detecting multiple touch point positions on an optical touch panel.

Accordingly, a method of detecting touch point positions on an optical touch panel according to the present invention is provided. The optical touch panel includes a processing unit, and at least three optical detectors divided into at least two detector groups. Each of the optical detectors is configured to output a signal indicating intensities of light detected thereby. The method comprises the steps of:

a) configuring the processing unit to receive the signals from the optical detectors, respectively;

b) configuring the processing unit to determine whether a number of touch points on the optical touch panel is greater than one according to the signals received in step a);

c) when it is determined in step b) that the number of the touch points is greater than one, configuring the processing unit to compute a plurality of sets of coordinates for each of the touch points according to the signals received in step a), each of the sets of coordinates being with respect to a corresponding one of the detector groups which includes the optical detectors that detect the touch points;

d) configuring the processing unit to select at least two of the touch points and the sets of coordinates corresponding to each of said at least two of the touch points according to a predetermined standard; and e) configuring the processing unit to select an optimum set of coordinates for each of said at least two of the touch points selected in step d) from the sets of coordinates corresponding to each of said at least two of the touch points.

Another object of the present invention is to provide an optical touch panel configured for detecting multiple touch point positions thereon.

According to another aspect, an optical touch panel of this invention comprises a support defining a surface and having a periphery, at least one light source generating light across the surface, at least three optical detectors, and a processing unit.

The optical detectors are spaced apart from each other and are arranged along one side of the periphery of the support. Each of the optical detectors is associated with a detection range across the surface and a reference line symmetrically and centrally disposed in the detection range thereof, and is operable to output a signal indicating intensities of light detected thereby within the detection range thereof. The optical detectors are divided into at least two detector groups each formed by two of the optical detectors. The reference lines associated with the two of the optical detectors in the same one of the detector groups cross each other.

The processing unit is coupled to the optical detectors for receiving the signals therefrom. The processing unit is operable to determine which of the optical detectors detect touch points within the respective detection range according to the signals received by the processing unit, and to obtain an optimum set of coordinates for at least one of the touch points with respect to an optimum detector group which is one of the detector groups formed by the optical detectors that detect the touch points.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 2:
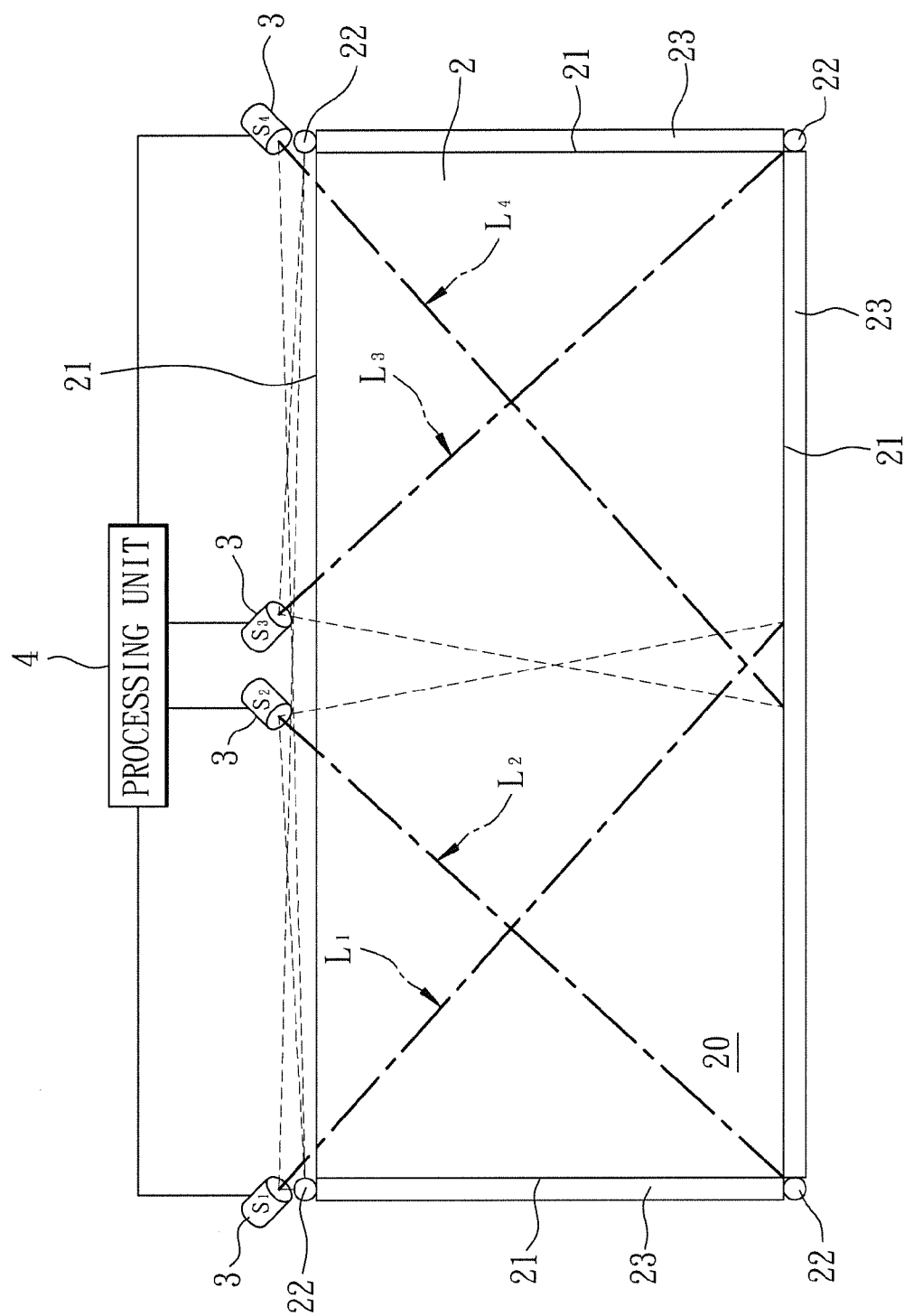
FIG. 2 is a schematic view of the preferred embodiment of an optical touch panel of this invention.

Referring to FIG. 2, a preferred embodiment of an optical touch panel according to the present invention includes a support 2 defining a surface 20 and having a periphery 21, at least one light source 22, at least one light guide 23, at least three optical detectors 3, and a processing unit 4. The surface 20 of the support 2 is configured to allow an object to make contact therewith. In this embodiment, the optical touch panel includes three of the light guides 23 surrounding at least a part of the periphery 21 of the support 2, and four of the light sources 22 arranged for directing light (such as infrared light, which is non-visible light) along the light guides 23 so that the light guides 23 are operative to direct the light received from the light sources 22 across the surface 20. The optical detectors 3 are spaced apart from each other, and are arranged along at least one side of the periphery 21 of the support 2. Each of the optical detectors 3 is operable to output a signal indicating intensities of light detected thereby. The processing unit 4 is coupled to the optical detectors 3 for receiving the signals therefrom, and is operable to obtain a set of coordinates for at least one touch point on the surface 20 according to the signals received from the optical detectors 3.

Figure 1:
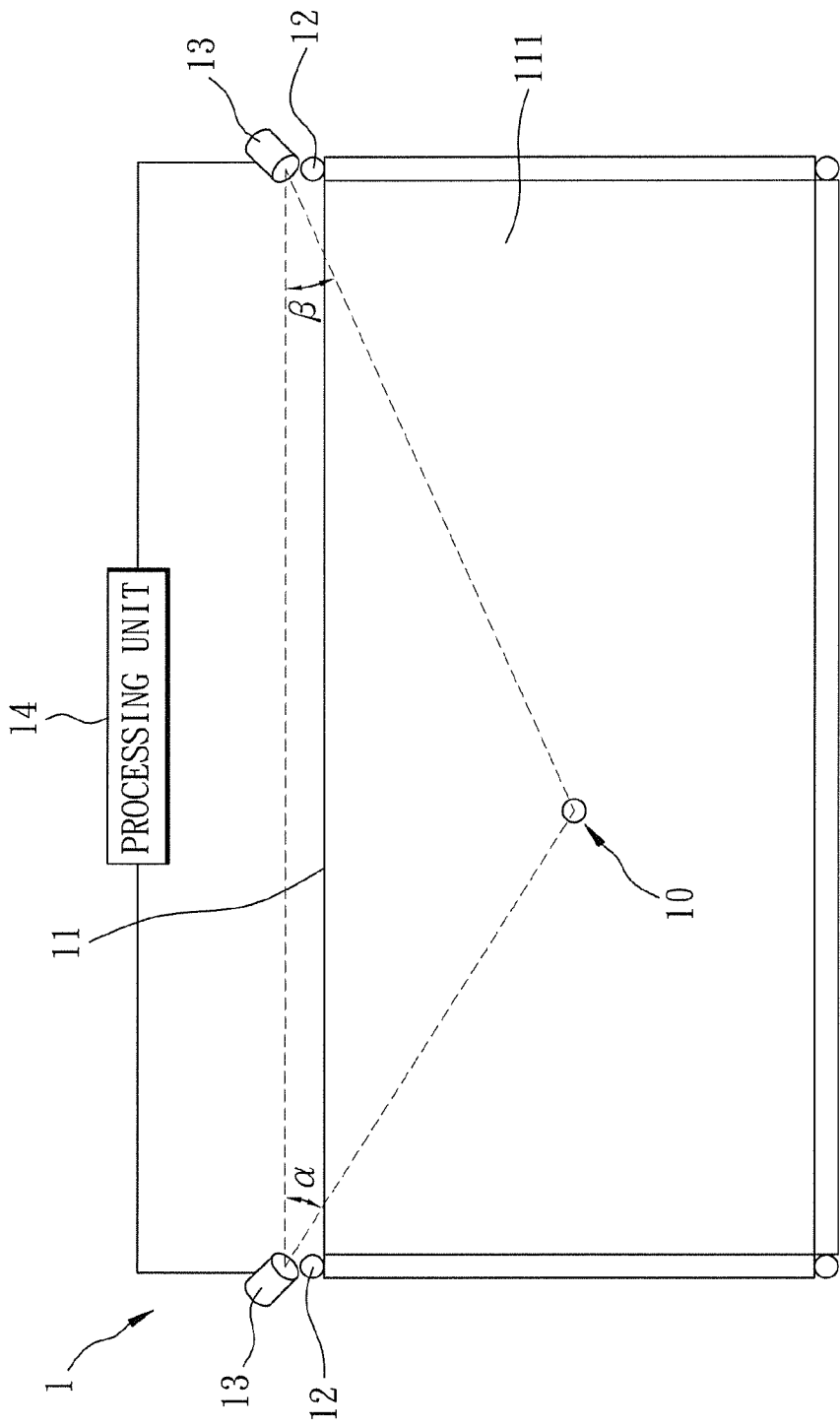
FIG. 1 is a schematic view of a conventional optical touch panel.

In particular, the optical detectors 3 are arranged along the same side (e.g., the top side as shown in FIG. 1) of the periphery of the support 2 in this embodiment, and a total number thereof is 2N. The optical detectors 3 are divided into N+1 detector groups, and each of the N+1 detector groups is formed by two of the optical detectors 3. For example, the N+1 detector groups are respectively formed by a pair of first and $2N^{th}$ ones of the optical detectors 3, and a pair of $(2i-1)^{th}$ and $2i^{th}$ ones of the optical detectors 3, where i=1 to N.

In this embodiment, the optical touch panel includes four of the optical detectors 3 (hereinafter referred to as $S_1$ to $S_4$ from left to right, respectively). Each of the optical detectors ($S_1$ to $S_4$) is associated with a detection range across the surface 20 and a reference line ($L_1$ to $L_4$, respectively) symmetrically and centrally disposed in the detection range thereof, and is operable to output a signal indicating intensities of light detected thereby within the detection range thereof. For each of the optical detectors ($S_1$ to $S_4$), the reference line ($L_1$ to $L_4$) associated therewith is non-perpendicular to said one side of the periphery 21 of the support 2 at which the optical detectors ($S_1$ to $S_4$) are arranged. The optical detectors ($S_1$ to $S_4$) are divided into three detector groups, and each of the detector groups is formed by two of the optical detectors ($S_1$ to $S_4$). The reference lines ($L_1$ to $L_4$) associated with said two of the optical detectors ($S_1$ to $S_4$) in the same one of the detector groups cross each other.

For example, in this embodiment, the first and second ones of the optical detectors ($S_1$ and $S_2$) constitute a first detector group, the third and fourth ones of the optical detectors ($S_3$ and $S_4$) constitute a second detector group, and the first and fourth ones of the optical detectors ($S_1$ and $S_4$) constitute a third detector group. In the first detector group, the reference lines ($L_1$ and $L_2$) associated with the first and second ones of the optical detectors ($S_1$ and $S_2$) cross each other. Similarly, the reference lines ($L_3$ and $L_4$) associated with the third and fourth ones of the optical detectors ($S_3$ and $S_4$) in the second detector group cross each other, and the reference lines ($L_1$ and $L_4$) associated with the first and fourth ones of the optical detectors ($S_1$ and $S_4$) in the third detector group cross each other. It should be noted that the total number and the arrangement of the optical detectors ($S_1$ to $S_4$) described herein are merely for illustrative purpose, and may be varied in other embodiments without departing from the scope of this invention.

Referring to FIGS. 2 to 5, the processing unit 4 is configured to implement a method of detecting touch point positions on the optical touch panel. The method includes the following steps shown in FIG. 3.

In step 501, the processing unit 4 is configured to receive the signals from the optical detectors ($S_1$ to $S_4$), respectively.

In step 502, for each of the signals received in step 501, the processing unit 4 is configured to determine whether the signal has an edge according to a threshold value (Thr), and to determine a number and positions of the edges when it is determined that the signal has an edge.

Figure 4:
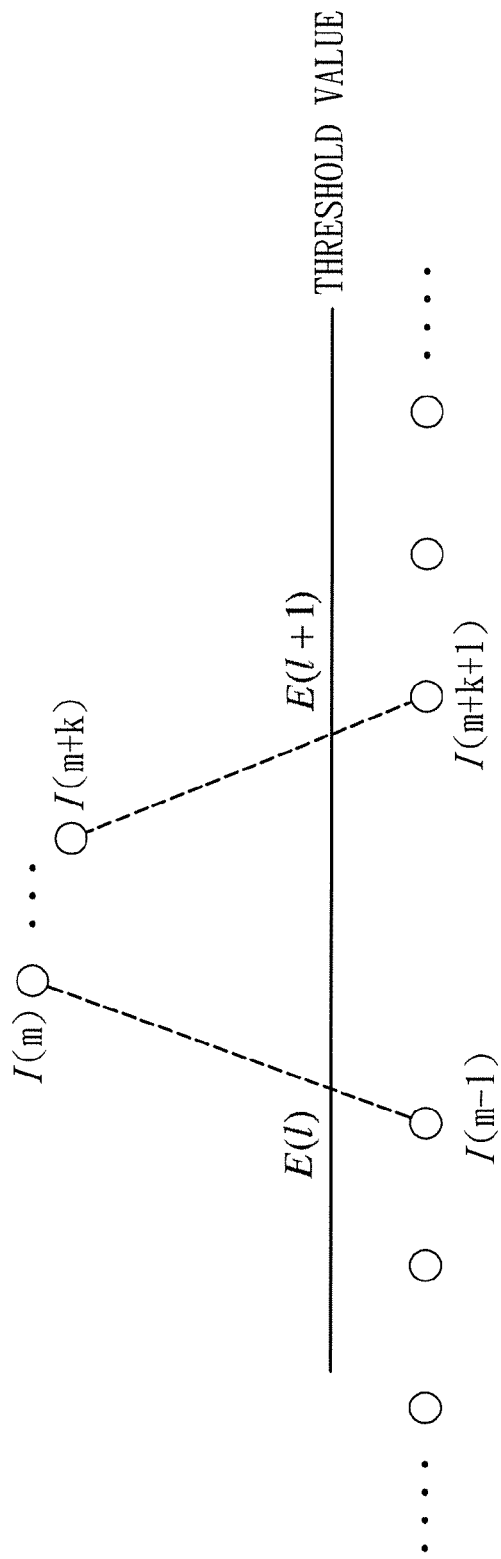
FIG. 4 illustrates a signal indicating intensities of light detected by an optical detector.

For example, an object present on the surface 20 of the support 2 may obstruct the light across the surface 20. Regarding the signal of one of the optical detectors ($S_1$ to $S_4$), the intensity of the signal corresponding to a $j^{th}$ pixel of said one of the optical detectors ($S_1$ to $S_4$) is referred to as I(j). The processing unit 4 is operable to compare the intensities I(j) of the signal with the threshold value (Thr). As shown in FIG. 4, when the intensities I(m−1) and I(m) corresponding to the $(m-1)^{th}$ and $m^{th}$ two adjacent pixels of said one of the optical detectors ($S_1$ to $S_4$) are respectively smaller than and greater than the threshold value (Thr), i.e., I(m−1)<Thr and I(m)>Thr, the processing unit 4 is operable to determine that the signal of said one of the optical detectors ($S_1$ to $S_4$) has an edge and a position of the edge is at E(l) as an intersection of a predetermined equation passing through the intensities I(m−1) and I(m) and a line along the threshold value (Thr). Similarly, when the intensities I(m+k) and I(m+k+1) corresponding to the $(m+k)^{th}$ and $(m+k+1)^{th}$ two adjacent pixels of said one of the optical detectors ($S_1$ to $S_4$) are respectively smaller and greater than the threshold value (Thr), i.e., I(m+k)<Thr and I(m+k+1)>Thr, it is determined that the signal of said one of the optical detectors ($S_1$ to $S_4$) has an edge and a position of the edge is at E(l+1) as an intersection of a predetermined equation passing through the intensities I(m+k) and I(m+k+1) and the line along the threshold value (Thr). The number of the edges within the signal of said one of the optical detectors ($S_1$ to $S_4$) is a number of the intersections. In this embodiment, each of the predetermined equations for determining the positions of the edges is a linear equation.

In step 503, the processing unit 4 is configured to determine presence of a touch point on the surface 20 according to the number of the edges within the signal of each of the optical detectors ($S_1$ to $S_4$). The flow goes to step 504 when the determination is affirmative, and goes back to step 501 when otherwise.

In this embodiment, when it is determined that the number of the edges in each of the signals of at least two of the optical detectors ($S_1$ to $S_4$) is greater than or equal to 2, the processing unit 4 is operable to determine the presence of a touch point. Since the detection range of each of the optical detectors ($S_1$ to $S_4$) is known, the processing unit 4 is configured to directly determine the presence of a touch point according to the number of the edges in the signal of each of the optical detectors ($S_1$ to $S_4$) and according to a predetermined standard. For example, for the first and fourth optical detectors ($S_1$ and $S_4$) in the third detector group, since the detection range thereof covers substantially the entire surface 20 of the support 2, the processing unit 4 is operable to determine that there is no touch point when the number of the edges in the signal of any one of the first and fourth optical detectors ($S_1$ and $S_4$) is smaller than 2. The predetermined standard may be varied due to different number and different arrangements of the optical detectors 3 in other embodiments.

In step 504, according to the number of the edges within the signal of each of the optical detectors ($S_1$ to $S_4$), the processing unit 4 is configured to determine which of the optical detectors ($S_1$ to $S_4$) detect the presence of a touch point and to determine whether a number of touch points on the surface 20 is greater than one. The processing unit 4 is configured to implement steps 505 to 507 when it is determined that there is only a single touch point on the surface 20, and to implement steps 508 to 511 when the number of touch points is greater than one. For example, similar to step 503, when the number of edges of the signal of each of the first and second optical detectors ($S_1$ and $S_2$) is equal to 2, the processing unit 4 is operable to determine that the first and second optical detectors ($S_1$ and $S_2$) detect the presence of a touch point (P) and that the number of the touch point (P) is equal to 1 (see FIG. 5).

In step 505, the processing unit 4 is configured to select an optimum detector group from the detector groups which includes the optical detectors (e.g., $S_1$, $S_2$ and $S_4$ shown in FIG. 5) that detect the single touch point. In this embodiment, the processing unit 4 is operable to select the optimum detector group as one of the two detector groups formed by two of the first, second and fourth optical detectors ($S_1$, $S_2$ and $S_4$) that detect the touch point and that have a minimum distance therebetween relative to the first, second and fourth optical detectors ($S_1$, $S_2$ and $S_4$) that detect the touch point and that form the other detector groups. Taking an example shown in FIG. 5, the first, second and fourth optical detectors ($S_1$, $S_2$ and $S_4$) detect the touch point (P), and a distance ($d_{12}$) between the first and second optical detectors ($S_1$ and $S_2$) in the first detector group is smaller than a distance between the first and fourth optical detectors ($S_1$ and $S_4$) in the third detector group. Therefore, the processing unit 4 is operable to select the first detector group which is formed by the first and second optical detectors ($S_1$, $S_2$) as the optimum detector group.

In step 506, the processing unit 4 is configured to compute a set of coordinates for the touch point (P) according to the signals received from the optical detectors ($S_1$, $S_2$) of the optimum detector group. In particular, the processing unit 4 is operable to obtain a pair of connecting lines each passing through the touch point (P) and a respective one of the optical detectors 3 in the optimum detector group, and to obtain a pair of included angles each between a respective one of the connecting lines and a base line passing through the optical detectors 3 in the optimum detector group. Subsequently, the processing unit 4 is operable to compute the set of coordinates for the touch point (P) based upon the included angles and the distance between the optical detectors 3 in the optimum detector group.

Figure 5:
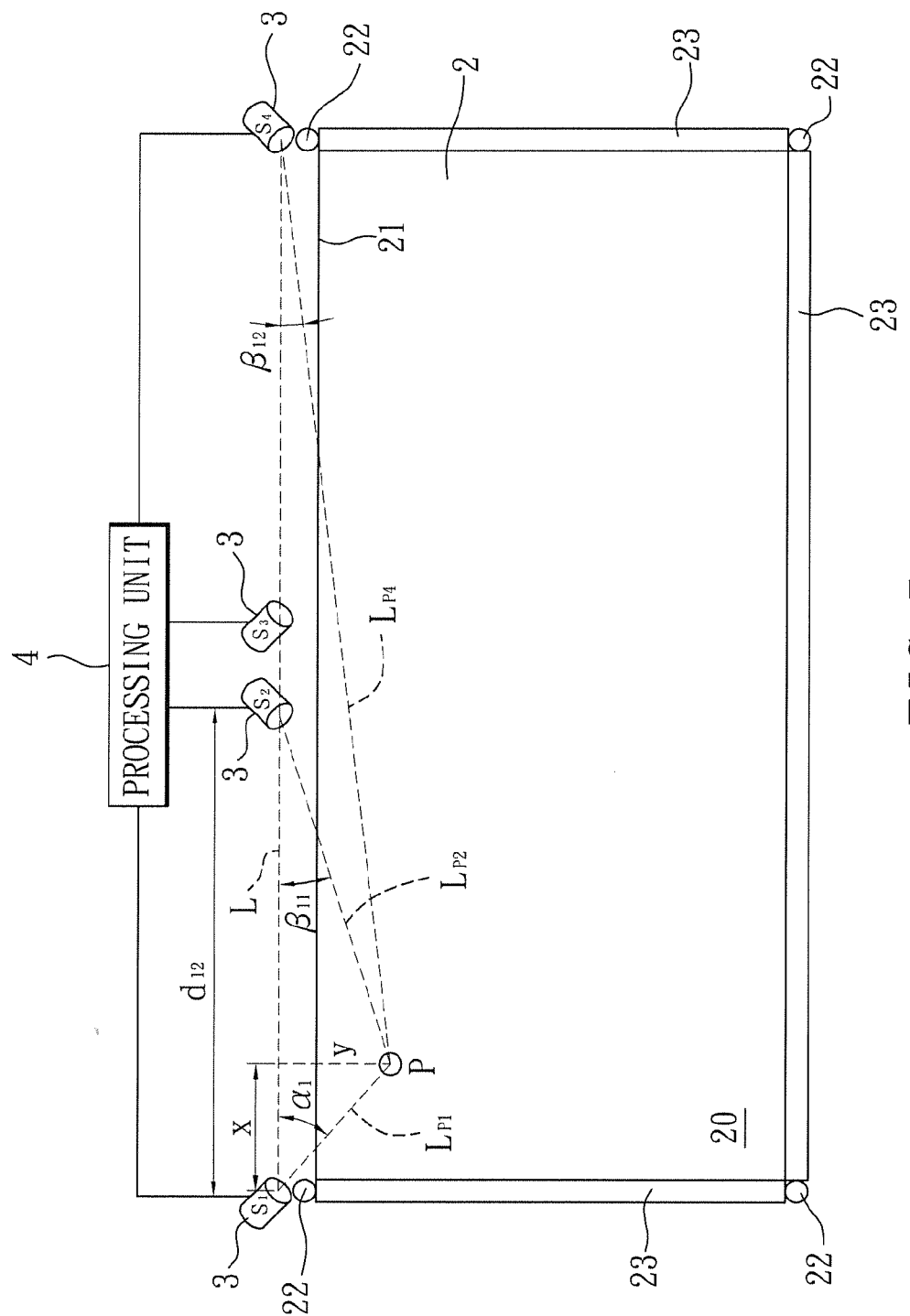
FIG. 5 is a schematic view of the optical touch panel of the preferred embodiment illustrating an example of a single touch point on the optical touch panel.

For example, FIG. 5 illustrates an included angle ($\alpha_1$) between a base line (L) passing through the first and second optical detectors ($S_1$ and $S_2$) in the optimum detector group and a connecting line ($L_{P1}$) passing through the touch point (P) and the first optical detector ($S_1$), and an included angle ($\beta_{11}$) between the base line (L) and another connecting line ($L_{P2}$) passing through the touch point (P) and the second optical detector ($S_2$). The processing unit 4 is operable to compute the set of the coordinates (x, y) for the touch point (P) based upon the following Equations (1) and (2).

$$x = \frac{\tan\beta_{11}}{(\tan\alpha_1 + \tan\beta_{11})} d_{12} \quad (1)$$

$$y = x \tan \alpha_1 \quad (2)$$

It should be noted that, in other embodiments, the processing unit 4 may be configured to implement different steps for computing the coordinates of the touch point (P) instead of steps 505 and 506. For instance, the processing unit 4 may be configured to obtain a plurality of included angles (e.g., $\alpha_1$, $\beta_{11}$ and $\beta_{12}$ shown in FIG. 5) each between the base line (L) and a respective connecting line passing through the touch point (P) and a corresponding one of the first, second and fourth optical detectors ($S_1$, $S_2$ and $S_4$) that detect the touch point (P). Then, the processing unit 4 is operable to select an optimum detector group formed by the first and second optical detectors ($S_1$ and $S_2$) corresponding to two larger ones of the included angles ($\alpha_1$ and $\beta_{11}$), and to compute the coordinates of the touch point (P) based upon Equations (1) and (2).

In step 507, the processing unit 4 is configured to output the set of the coordinates (x, y) obtained in step 506. Then, the flow goes back to step 501.

Figure 3:
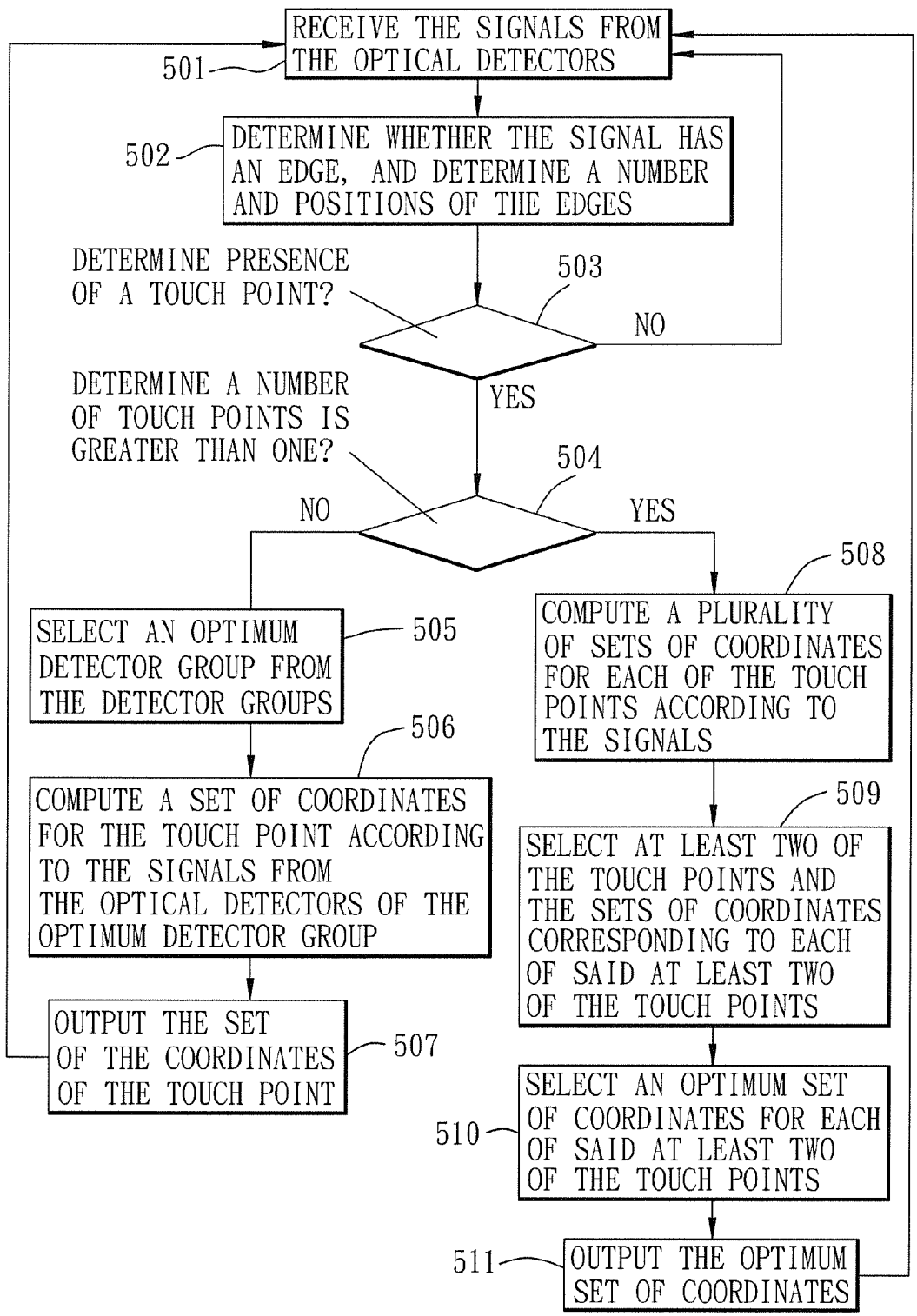
FIG. 3 is a flow chart of a method of detecting touch point positions on an optical touch panel according to this invention.
Figure 6:
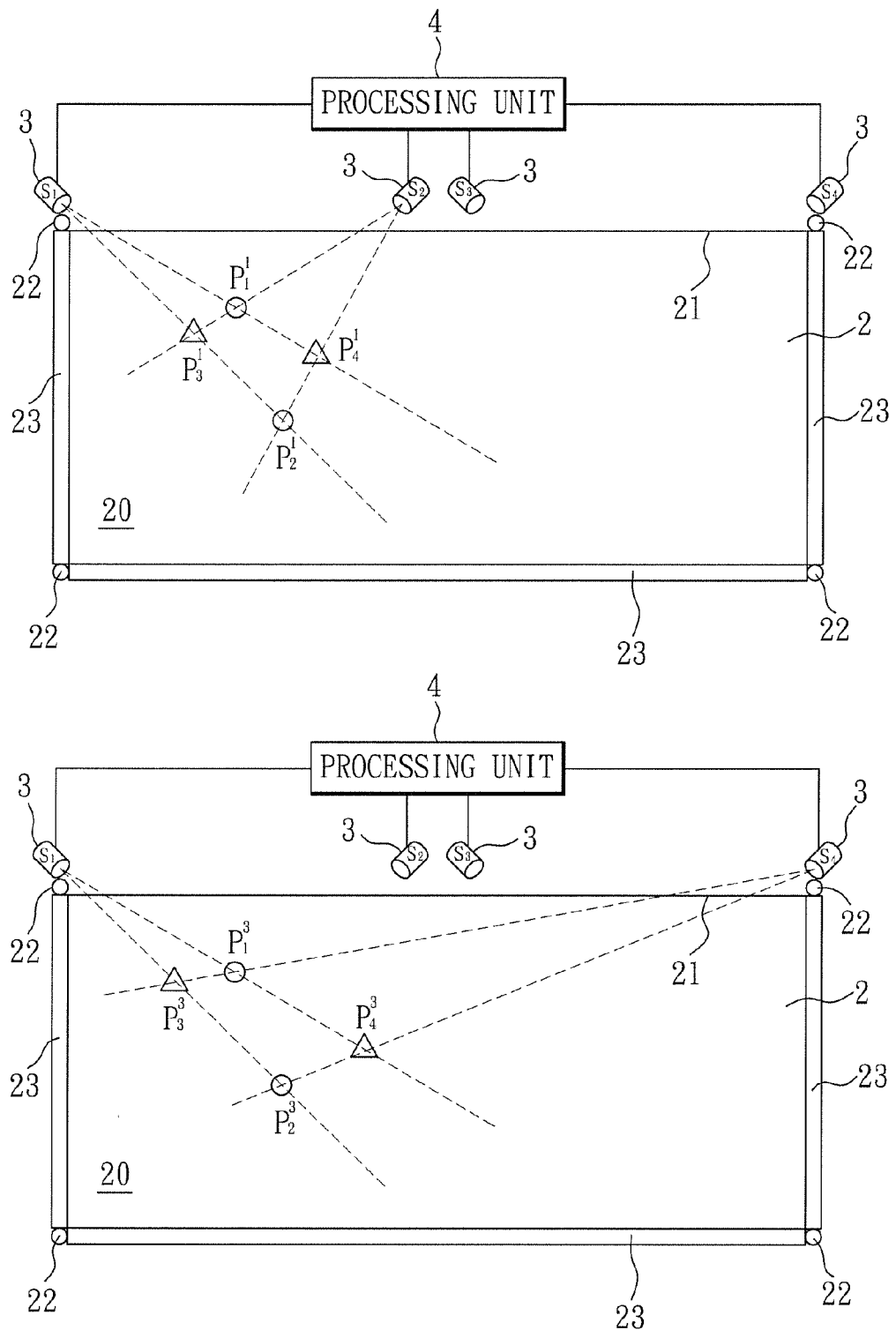
FIG. 6 is a schematic view of the optical touch panel of the preferred embodiment illustrating another example of a pair of touch points on the optical touch panel.

Referring to FIGS. 3 and 6, when it is determined in step 504 that the number of touch points is greater than one, the processing unit 4 is configured, in step 508, to compute a plurality of sets of coordinates for each of the touch points according to the signals received in step 501. Each of the sets of coordinates is with respect to a corresponding one of the detector groups which includes the optical detectors 3 that detect the touch points.

For example, as shown in FIG. 6, when there are two touch points on the surface 20 of the support 2, the first and second optical detectors ($S_1$ and $S_2$) of the first detector group may detect four touch points, and the first and fourth optical detectors ($S_1$ and $S_4$) of the third detector group may also detect four touch points. In step 508, the processing unit 4 is operable to compute a set of coordinates for each of the touch points ($P_1^1$, $P_2^1$, $P_3^1$ and $P_4^1$) detected by the first detector group and for each of the touch points ($P_1^3$, $P_2^3$, $P_3^3$ and $P_4^3$) detected by the third detector group. Since the manner of computing the set of coordinates in step 508 is similar to that of step 506, details thereof will be omitted herein for the sake of brevity.

In step 509, the processing unit 4 is configured to select at least two of the touch points and the sets of coordinates corresponding to each of said at least two of the touch points according to a predetermined standard. For each of the selected two of the touch points, the sets of coordinates corresponding thereto are with respect to the detector groups, respectively. In this embodiment, the predetermined standard is a predetermined distance. In particular, for each of the touch points, the processing unit 4 is operable to compute a distance between one of the sets of coordinates with respect to one of the detector groups and another one of the sets of coordinates with respect to another one of the detector groups. Then, the processing unit 4 is operable to compare the distances thus computed with the predetermined distance, and to select said at least two of the touch points each of which corresponds to the sets of coordinates with the distance smaller than the predetermined distance.

For example, in FIG. 6, the processing unit 4 is operable to compute a distance between the set of coordinates of the touch point ($P_1^1$) with respect to the first detector group and the set of coordinates of each of the touch points ($P_1^3$, $P_2^3$, $P_3^3$ and $P_4^3$) with respect to the third detector group. The distance between the touch point ($P_1^1$) and each of the touch points ($P_1^3$, $P_2^3$, $P_3^3$ and $P_4^3$) is referred to as $D(P_1^1, P_j^3)$, where j=1 to 4. Similarly, a distance $D(P_2^1, P_j^3)$ between the set of coordinates of the touch point ($P_2^1$) and the set of coordinates of each of the touch points ($P_1^3$, $P_2^3$, $P_3^3$ and $P_4^3$), a distance $D(P_3^1, P_j^3)$ between the set of coordinates of the touch point ($P_3^1$) and the set of coordinates of each of the touch points ($P_1^3$, $P_2^3$, $P_3^3$ and $P_4^3$), and a distance $D(P_4^1, P_j^3)$ between the set of coordinates of the touch point ($P_4^1$) and the set of coordinates of each of the touch points ($P_1^3$, $P_2^3$, $P_3^3$ and $P_4^3$) are computed in step 509.

It is assumed that the distance $D(P_1^1, P_1^3)$ and the distance $D(P_2^1, P_2^3)$ are smaller than the predetermined distance.

Accordingly, the touch point corresponding to the sets of coordinates ($P_1^1$, $P_1^3$), and the touch point corresponding to the sets of coordinates ($P_2^1$, $P_2^3$) are selected in step 509. Further, the rest of the touch points respectively corresponding to the sets of the coordinates ($P_3^1$, $P_3^3$) and ($P_4^1$, $P_4^3$) are considered as ghost points.

In step 510, the processing unit 4 is configured to select an optimum set of coordinates for each of the selected two touch points selected in step 509 from the sets of coordinates corresponding to each of the selected two touch points. In particular, the processing unit 4 is operable to select an optimum detector group from the detector groups which includes the optical detectors 3 that detect the touch points, and to select the optimum set of coordinates for each of the selected two touch points from the sets of coordinates that are with respect to the optimum detector group. Thus, the optimum set of coordinates is computed based upon the signals from the optical detectors 3 of the optimum detector group. The optimum detector group is selected in a manner similar to that of step 505, and details thereof will be omitted herein for the sake of brevity.

For example, the processing unit 4 is operable to select the first detector group as the optimum detector group, and to select the sets of coordinates ($P_1^1$) and ($P_2^1$) as the optimum sets of coordinates for the selected two touch points, respectively.

In step 511, the processing unit 4 is configured to output the optimum sets of coordinates ($P_1^1$, $P_2^1$) obtained in step 510. Then, the flow goes back to step 501.

In summary, the configuration and arrangement of the optical detectors ($S_1$ to $S_4$) according to this invention and the processing unit 4 cooperate to obtain the sets of coordinates corresponding to the touch points. In particular, the set of coordinates corresponding to each of multiple touch points is relatively accurate by virtue of the configuration and arrangement of the optical detectors ($S_1$ to $S_4$).

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method of detecting touch point positions on an optical touch panel, the optical touch panel including a processing unit, and at least three optical detectors divided into at least two detector groups, each of the optical detectors being configured to output a signal indicating intensities of light detected thereby, said method comprising:
    a) arranging at least two of the optical detectors to establish non-overlapping fields of view, and configuring the processing unit to receive the signals from the optical detectors, respectively;
    b) configuring the processing unit to determine whether a number of touch points on the optical touch panel is greater than one according to the signals received in process a);
    c) when the number of touch points is determined in process b) to be greater than one, executing the processing unit to compute a plurality of sets of coordinates for each of the touch points according to the signals received in process a), each of the sets of coordinates being established with respect to a corresponding one of the detector groups containing optical detectors detecting the touch points;
    d) executing the processing unit to compute for each of the touch points a distance between one of the sets of coordinates established with respect to one of the detector groups and another one of the sets of coordinates established with respect to another one of the detector groups, and to select at least two of the touch points and the sets of coordinates corresponding to each of said at least two of the touch points responsive to comparison of the distance to a predetermined standard; and
    e) executing the processing unit to select an optimum set of coordinates for each of said at least two of the touch points selected in process d) from the sets of coordinates corresponding to each of said at least two of the touch points.

2. The method as claimed in claim 1, wherein process b) includes the sub-processes of:
    b1) configuring the processing unit to compare the intensities of each of the signals received in process a) with a threshold value;
    b2) when the intensities of one of the signals and corresponding to two adjacent pixels of a corresponding one of the optical detectors are respectively greater than and smaller than the threshold value, configuring the processing unit to determine that said one of the signals has an edge; and
    b3) configuring the processing unit to determine the number of the touch points according to a number of the edges in each of the signals.

3. The method as claimed in claim 2, wherein, in process c), the processing unit is configured to compute the sets of coordinates for each of the touch points according to locations of the edges in each of the signals.

4. The method as claimed in claim 1, wherein process e) includes the sub-process of:
    e1) configuring the processing unit to select an optimum detector group from the detector groups; and
    e2) configuring the processing unit to select the optimum set of coordinates for each of said at least two of the touch points from the sets of coordinates that are with respect to the optimum detector group.

5. The method as claimed in claim 4, wherein, in sub-process e1), the processing unit is configured to select the optimum detector group as one of the detector groups formed by two of the optical detectors that detect the touch points and that have a minimum distance therebetween relative to the optical detectors that detect the touch points and that form the other detector groups.

6. An optical touch panel comprising:
    a support defining a surface and having a periphery;
    at least one light source generating light across said surface;
    at least three optical detectors spaced apart from each other and arranged along at least one side of said periphery of said support with at least two of the optical detectors establishing non-overlapping fields of view, each of said optical detectors being associated with a detection range across said surface and a reference line symmetrically and centrally disposed in the detection range thereof, and being operable to output a signal indicating intensities of light detected thereby within the detection range thereof, said optical detectors being divided into at least two detector groups each formed by two of said optical detectors, the reference lines associated with said two of said optical detectors in the same one of the detector groups crossing each other; and
    a processing unit coupled to said optical detectors for receiving the signals therefrom, said processing unit being operable to selectively determine said optical detectors detecting touch points within the respective detection range according to the signals received by said processing unit, and to obtain an optimum set of coordinates for at least one of the touch points with respect to an optimum detector group selected from the detector groups formed by said optical detectors detecting the touch points;

wherein said processing unit is further operable to:
  determine whether a number of touch points on said surface is greater than one according to the signals received from said optical detectors;
  when the number of touch points is determined to be greater than one, compute a plurality of sets of coordinates for each of the touch points according to the signals received by said processing unit, each of the sets of coordinates being computed with respect to a corresponding one of the detector groups containing optical detectors detecting the touch points;
  for each of the touch points, compute a distance between one of the sets of coordinates established with respect to one of the detector groups and another one of the sets of coordinates established with respect to another one of the detector groups;
  select at least two of the touch points and the sets of coordinates corresponding to each of said at least two of the touch points responsive to comparison of the distance to a predetermined standard; and
  select the optimum set of coordinates for each of said at least two of the touch points from the sets of coordinates corresponding to each of said at least two of the touch points.

7. The optical touch panel as claimed in claim 6, wherein said processing unit is further operable to:
  compare the intensities of each of the signals received by said processing unit with a threshold value;
  when the intensities of one of the signals and corresponding to two adjacent pixels of a corresponding one of said optical detectors are respectively greater than and smaller than the threshold value, determine an edge in said one of the signals; and
  determine the number of the touch points according to a number of the edges in each of the signals.

8. The optical touch panel as claimed in claim 7, wherein said processing unit is further operable to compute the sets of coordinates for each of the touch points according to locations of the edges in each of the signals.

9. The optical touch panel as claimed in claim 6, wherein said optical detectors are arranged along the same side of said periphery of said support.

10. The optical touch panel as claimed in claim 6, wherein, for each of said optical detectors, the reference line associated therewith is non-perpendicular to said one side of said periphery of said support at which said optical detector is arranged.

11. The optical touch panel as claimed in claim 6, wherein said optical detectors are arranged along the same side of said periphery of said support, and a total number of said optical detectors is 2N, said optical detectors being divided into N+1 detector groups respectively formed by a pair of first and $2N^{th}$ ones of said optical detectors, and a pair of $(2i-1)^{th}$ and $2i^{th}$ ones of said optical detectors, where i=1 to N.

12. The optical touch panel as claimed in claim 6, wherein said processing unit is operable to select the optimum detector group as one of the detector group formed by two of said optical detectors that detect the touch points and that have a minimum distance therebetween relative to said optical detectors that detect the touch points and that form the other detector groups.

* * * * *